(12) United States Patent
Deshpande et al.

(10) Patent No.: US 7,149,936 B2
(45) Date of Patent: Dec. 12, 2006

(54) INTERACTIVE MULTIMEDIA FOR REMOTE DIAGNOSTICS AND MAINTENANCE OF A MULTIFUNCTIONAL PERIPHERAL

(75) Inventors: Sachin Govind Deshpande, Vancouver, WA (US); John Calvin Thomas, Portland, OR (US); Michael Douglas Baker, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 531 days.

(21) Appl. No.: 10/261,822

(22) Filed: Sep. 30, 2002

(65) Prior Publication Data

US 2004/0064762 A1 Apr. 1, 2004

(51) Int. Cl.
*G06F 11/00* (2006.01)

(52) U.S. Cl. .......................... 714/57; 714/46; 714/44; 714/30

(58) Field of Classification Search .................. 714/27, 714/30, 37, 40, 44, 46, 57
See application file for complete search history.

(56) References Cited

U.S. PATENT DOCUMENTS

| | | | |
|---|---|---|---|
| 5,087,971 A | 2/1992 | Sakata et al. | |
| 5,216,514 A | 6/1993 | Hong et al. | |
| 5,369,469 A * | 11/1994 | Leo et al. | 399/8 |
| 5,457,780 A | 10/1995 | Shaw et al. | |
| 5,557,342 A | 9/1996 | Eto et al. | |
| 5,774,663 A | 6/1998 | Randle et al. | |
| 5,826,008 A * | 10/1998 | Bluvband | 714/57 |
| 5,854,828 A * | 12/1998 | Kocis et al. | 379/93.31 |
| 5,983,369 A * | 11/1999 | Bakoglu et al. | 714/46 |
| 5,991,805 A * | 11/1999 | Krukovsky | 709/223 |
| 6,058,372 A | 5/2000 | Sweet et al. | |
| 6,173,422 B1 * | 1/2001 | Kimura et al. | 714/57 |
| 6,269,122 B1 | 7/2001 | Prasad et al. | |
| 6,279,125 B1 | 8/2001 | Klein | |
| 6,285,932 B1 | 9/2001 | de Bellefeuille et al. | |
| 6,442,712 B1 * | 8/2002 | Jeon | 714/43 |
| 6,553,238 B1 * | 4/2003 | Ginzel et al. | 455/557 |
| 6,665,085 B1 * | 12/2003 | Edmunds et al. | 358/1.15 |
| 6,731,206 B1 * | 5/2004 | Yang et al. | 340/500 |
| 6,757,849 B1 * | 6/2004 | Balluff | 714/44 |
| 6,782,495 B1 * | 8/2004 | Bernklau-Halvor | 714/44 |
| 6,792,321 B1 * | 9/2004 | Sepe, Jr. | 700/65 |

(Continued)

OTHER PUBLICATIONS

Newton's Telecom Dictionary; Feb. 2002; Eighteenth Edition; p. 168; CODEC definition.*

(Continued)

*Primary Examiner*—Scott Baderman
*Assistant Examiner*—Joshua Lohn
(74) *Attorney, Agent, or Firm*—Michael Blaine Brooks, P.C.; Rosemarie F. Jones; David Ripma

(57) ABSTRACT

An interactive multimedia system for remote diagnostics of, maintenance of, and assistance pertaining to a multifunction peripheral preferably includes a multifunction peripheral, a remote service endpoint, and a network system over which the multifunction peripheral communicates with the remote service endpoint. An audio/visual capture device and a display are preferably communicatively associated with the multifunction peripheral communication entity. The remote service endpoint provides assistance based on the audio/video data over the display in such exemplary forms as text, images, multimedia presentation, audio presentations, video presentations, or live interactive communications. The present invention is also directed to a method performed by a multifunction peripheral that provides interactive multimedia for remote diagnostics of, maintenance of, and assistance regarding a multifunction peripheral.

32 Claims, 9 Drawing Sheets

U.S. PATENT DOCUMENTS

| | | | |
|---|---|---|---|
| 6,885,469 B1 * | 4/2005 | Tanimoto | 358/1.14 |
| 6,957,365 B1 * | 10/2005 | Gross et al. | 714/25 |
| 2001/0004241 A1 | 6/2001 | Fukano et al. | |
| 2003/0210659 A1 * | 11/2003 | Chu et al. | 370/320 |

OTHER PUBLICATIONS

Newton's Telecom Dictionary; Feb. 2002; Eighteenth Edition; pp. 340-341; H.323 definition.*

* cited by examiner

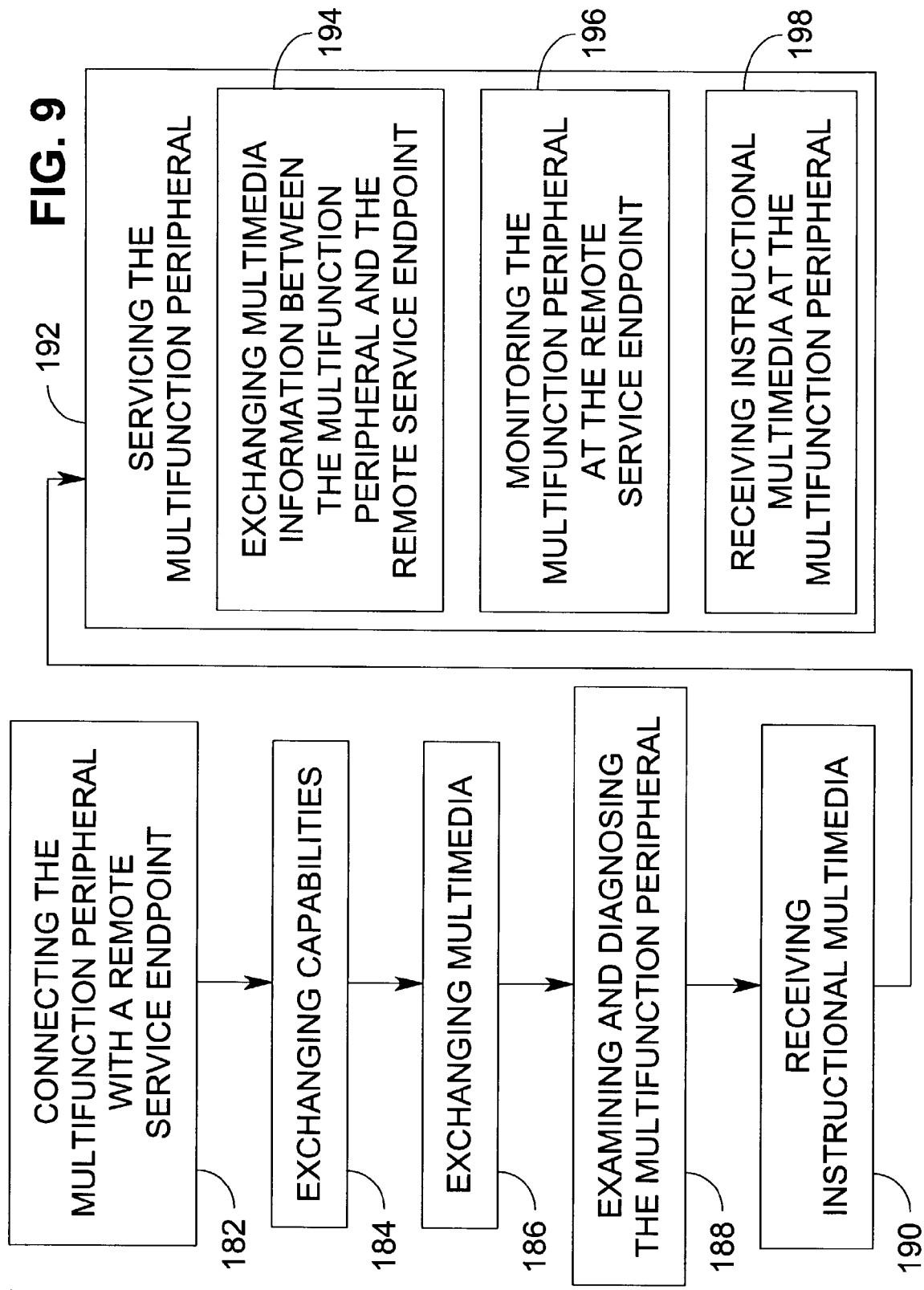

INTERACTIVE MULTIMEDIA FOR REMOTE DIAGNOSTICS AND MAINTENANCE OF A MULTIFUNCTIONAL PERIPHERAL

BACKGROUND OF INVENTION

The present invention is directed to a multifunction peripheral and more particularly to a multifunction peripheral configured for supporting interactive multimedia (audio, video, data, and/or control signals) for remote diagnostics, maintenance, and assistance.

Peripheral devices allow users to put information into or get information out of a computer system. Peripheral devices include, but are not limited to, printers, scanners, media readers, copiers, and facsimile machines. Earlier generations of peripheral devices performed a single function, but many peripheral devices today are able to perform multiple functions. A multifunction peripheral (MFP) is a peripheral device that can perform the functions of more than one traditional peripheral device. For example, a single device that can perform the functions of a printer, scanner, media reader, copier, and facsimile machine is a multifunction peripheral. For purposes of this invention, a multifunction peripheral will also include single-function machines especially if they are sophisticated, networked, and/or digital machines. Multifunction peripherals such as Sharp's AR-M350 and AR-M450 Digital Imager, not only afford a client multifunctional capability, but also the flexibility of printing/copying on both sides of the paper, a choice of at least four paper sizes, paper collation, and stapling. Other exemplary multifunction peripherals include Sharp's AR-505 printer/copier. Multifunction peripherals have become commonplace in many commercial settings and are becoming affordable for personal use.

Although multifunction peripherals have clear advantages over their single function predecessors, a disadvantage of these machines is that their level of sophistication frequently makes servicing them or even using them problematic.

A first example of a problem encountered when using multifunction peripherals is the simple maintenance problem of a paper jam. When a paper jam occurs, the user will need to access the machine in various locations to identify and remove the paper jam. The paper jam could be located in the scanning portion of the multifunction peripheral or the copier/printer portion. A second example of problems encountered when using multifunction peripherals are the everyday problems of basic maintenance and servicing such as adding paper, ink, toner, staples, and/or developer. These everyday problems, while no problem to a sophisticated user or a user familiar with a particular multifunction peripheral, can confuse infrequent users or less sophisticated users of a multifunction peripheral. A third example of problems encountered when using multifunction peripherals are true technical problems. True technical problems are generally more complicated and generally require a service technician to fix or repair. True technical problems, for purposes of this invention, also include installation of new hardware and software. A fourth example of a problem encountered when using multifunction peripherals involves the basic functions of the multifunction peripheral. Some users may have difficulties navigating the user interface to identify and use basic functions of interest. For example, a walk-up user may want to collate and staple output papers or transmit a document to a remote party using the network scanner.

Typical multifunction peripherals have associated written (hardcopy or electronic) user manuals or materials. When a user encounters a problem or desires to access a function, the user must read the often-convoluted documentation, determine if the particular problem is discussed in the materials, and then follow sketchy and difficult to understand instructions. This generally requires a significant time investment to solve a particular problem or access a particular function. It also assumes that the written materials are available to the user.

Newer or higher-end multifunction peripherals may include a few lines of textual instructions on an integral user interface display. This type of integral user interface may be used in a menu-like fashion or to provide simple textual messages. For example, a properly functioning multifunction peripheral may indicate that it is "ready." Everyday problems or simple problems may trigger the display of error messages or instructions such as "low ink," "load paper," or "paper jam" on the user interface display. This type of multifunction peripheral may also display a numerical error code on the user interface. The error message, instructions, or code may give the user some idea of what the problem is, but it generally requires an unskilled user to return to the written materials to solve the problem.

Expensive commercial multifunction peripherals may include a larger user interface display for displaying static images. These prior art devices may have help menus accessible from the user interface or, when an error occurs, instructions are automatically made available to the user. Instructions may be accompanied by a schematic drawing showing the part of the multifunction peripheral to be accessed along with arrows or other directional/positional indications. The schematic drawings may further show the relevant components of the multifunction peripheral to be manipulated in order to maintain the machine and directional arrows. These static images, however, are extremely limited in detail and it is often difficult to determine what they are actually depicting. In addition, even if directional arrows are present, their meaning can be difficult to interpret. When high-end multifunction peripherals become inoperable, the user may be presented with textual instructions and static images shown on an integral user interface display 142. The user of the high-end multifunction peripheral may be instructed to move systematically through the static images, and at each image the user may be required to check certain areas of the multifunction peripheral for a malfunction (e.g., a paper jam, etc.). If the user does not identify the malfunction that has rendered the multifunction peripheral inoperable, the user has few options other than to call a service representative for assistance.

Service representatives are usually located at a remote site and may be contacted by telephone. Before coming on-site, the remote service technician (RST) typically requests information from the user concerning the multifunction peripheral prior to coming on-site. Users that are not familiar with the multifunction peripheral or users that are not technically astute may not be able to provide the remote service technician with enough detail to make a substantial diagnosis of the failure. Even if the user is capable of providing the remote service technician with an acceptable level of detail, prior art multifunction peripherals do not allow the user to provide the remote service technician with real time diagnostic sensor data, sounds produced by the machine (which may indicate a failed component), or images of components (which may show signs of wear).

U.S. Pat. No. 6,279,125 B1 to Klein is directed to computer system diagnostics. The Klein system enables reporting of diagnostic data from a user's computer to a diagnostic technician or an automated diagnostic system. The information from the system may be used to report data during a telephone conversation with the diagnostic technician. The Klein system includes a software-implemented method of reporting computer system diagnostic information. Specifically, the Klein system receives a report specification and generates an audio signal representation of the report data. The generated audio signal may be a telephone compatible voice-bandwidth signal and may include speech generated by a text-to-speech converter. This system merely automates the sending of textual data.

BRIEF SUMMARY OF THE INVENTION

The disclosed invention solves the aforementioned problems by providing a multifunction peripheral for supporting interactive multimedia (including audio, video, data, and/or control signals) for remote diagnostics, maintenance, and assistance. A possible benefit of incorporating this invention in a multifunction peripheral may be a lowered cost of ownership. Additionally, the marketing strength of the multifunction peripheral may be elevated, as potential buyers may perceive this feature as adding an additional level of available service options.

The present invention is directed to an interactive multimedia system for remote diagnostics of, maintenance of, and assistance pertaining to a multifunction peripheral. One preferred embodiment includes a multifunction peripheral, a remote service endpoint, and a network system over which the multifunction peripheral communicates with the remote service endpoint. An audio/visual capture device and a display are preferably communicatively associated with the multifunction peripheral communication entity. The remote service endpoint provides assistance based on the audio/video data over the display in such exemplary forms as text, images, multimedia presentation, audio presentations, video presentations, or live interactive communications.

In one preferred embodiment, the interactive multimedia system further includes an error sensor/generator for sensing a multifunction peripheral error such as a simple maintenance problem, an everyday problem associated with basic maintenance and servicing, technical problems, installation of initial hardware and software, and field upgrades of hardware and software.

In one preferred embodiment, the interactive multimedia system further includes a user terminal that functions as an intermediary between a multifunction peripheral and the network system.

The present invention is also directed to a method performed by a multifunction peripheral that provides interactive multimedia for remote diagnostics of, maintenance of, and assistance regarding a multifunction peripheral.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 9 is a flow chart showing an exemplary method performed by a multifunction peripheral or user terminal of the present invention.

DETAILED DESCRIPTION OF THE INVENTION

Figure 1:
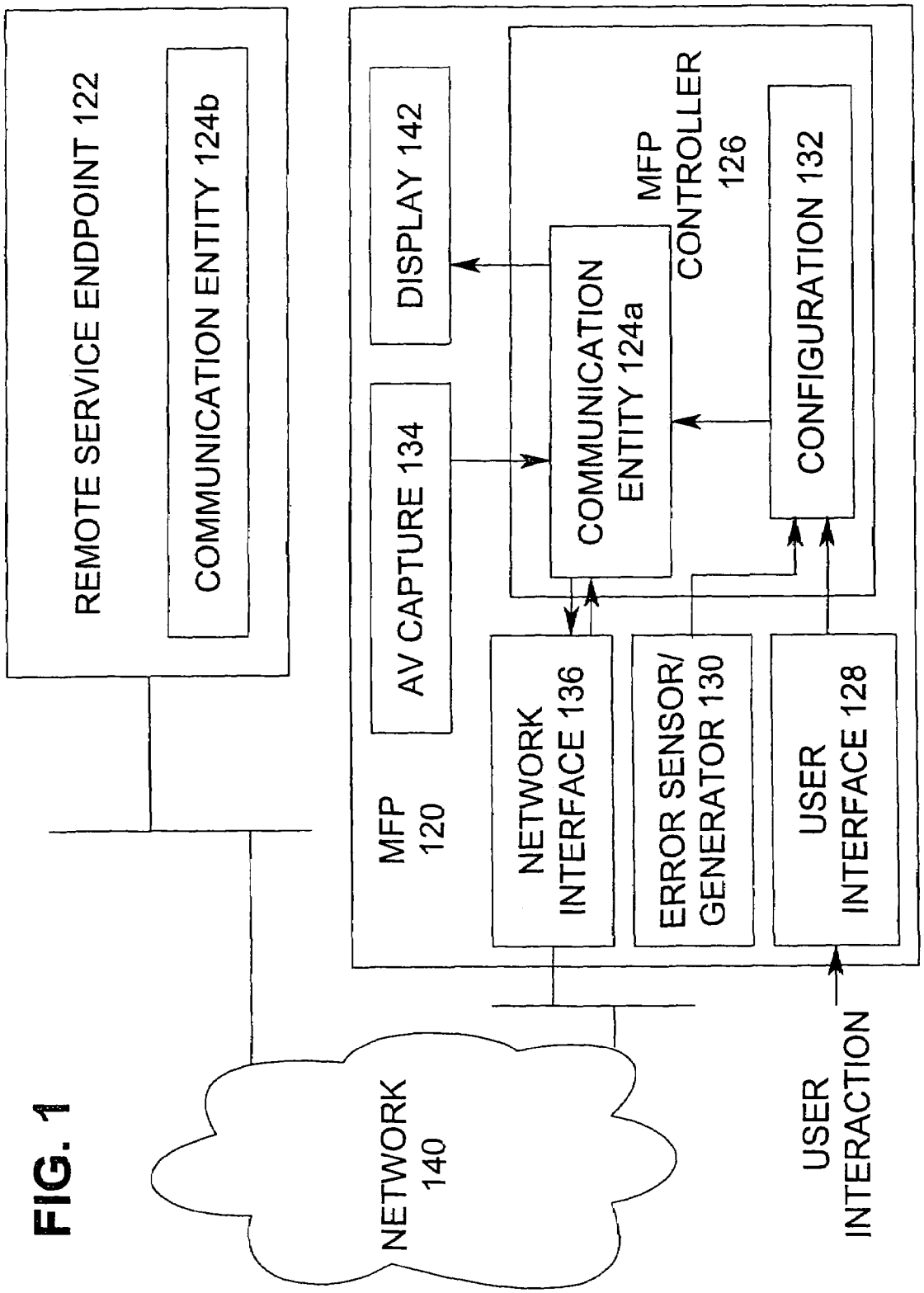
FIG. 1 is a schematic diagram of an exemplary first preferred embodiment of the present invention including a multifunction peripheral in communication with a remote service endpoint.

The present invention is directed to multifunction peripheral and more particularly to a multifunction peripheral configured for supporting real-time interactive multimedia (audio, video, data, and/or control signals) for remote diagnostics, maintenance, and assistance. The present invention recognizes that even if a user is capable of providing a remote service technician with an acceptable level of detail, prior art multifunction peripherals do not allow the user to provide the remote service technician with real time diagnostic sensor data, sounds produced by the machine (which may indicate a failed component), or images of components (which may show signs of wear).

Using the present invention, the remote service technician can: (1) remotely access the multifunction peripheral; (2) acquire diagnostic data; (3) hear the multifunction peripheral in operation; (4) see the inner workings of the multifunction peripheral; (5) speak with the user at the multifunction peripheral; and (6) instruct the user (while the user stands at the multifunction peripheral) to provide real-time sounds/images/data of various multifunction peripheral settings and components. The remote service technician would then be able to provide a more accurate diagnosis of the multifunction peripheral failure. Once the remote service technician accurately diagnoses the failure, he can instruct the user on how to remedy the failure and ship the user the necessary parts if required. If the user is able to repair the machine, the remote service technician will not have to visit the user's site thereby substantially reducing the cost of ownership of the multifunction peripheral.

On the other hand, if the remote service technician must visit the site, the time required to repair the multifunction peripheral should be substantially lessened because the remote service technician will have already made a detailed analysis of the malfunction based on the "pre-acquired" diagnostic and sensory data. Once the remote service technician is on-site, the remote service technician will be able to interact, in real time, with additional service personal at the remote service technician's office. Again, the cost of ownership of the multifunction peripheral will be reduced.

Another possible advantage of the present invention is that, if the remote service technician has remote access to the diagnostic data generated by the multifunction peripheral, the remote service technician can assist the user in providing preventative maintenance and even instruct an inexperienced user on basic and everyday problems.

The present invention supports two-way, real-time interactive multimedia (audio, video, data, and/or control signals) for remote diagnostics, maintenance, and assistance. Specifically, the multifunction peripheral can receive streaming video (and/or still photos), receive audio communication, and/or receive data from a remote location. Additionally, the multifunction peripheral may capture and send streaming video signals (and/or still photos), send audio communication, and/or send data to the remote location. The audio and/or video signals may be captured using an audio/visual (AV) capture device functionally associated with the multifunction peripheral. Thus, the current invention, unlike the prior art, allows a user to: grant a service technician remote access to the multifunction peripheral, acquire and push diagnostic data to the remote service technician, and simultaneously transmit and receive sound and streaming video to/from the remote service technician while speaking with the remote service technician.

Figure 2:
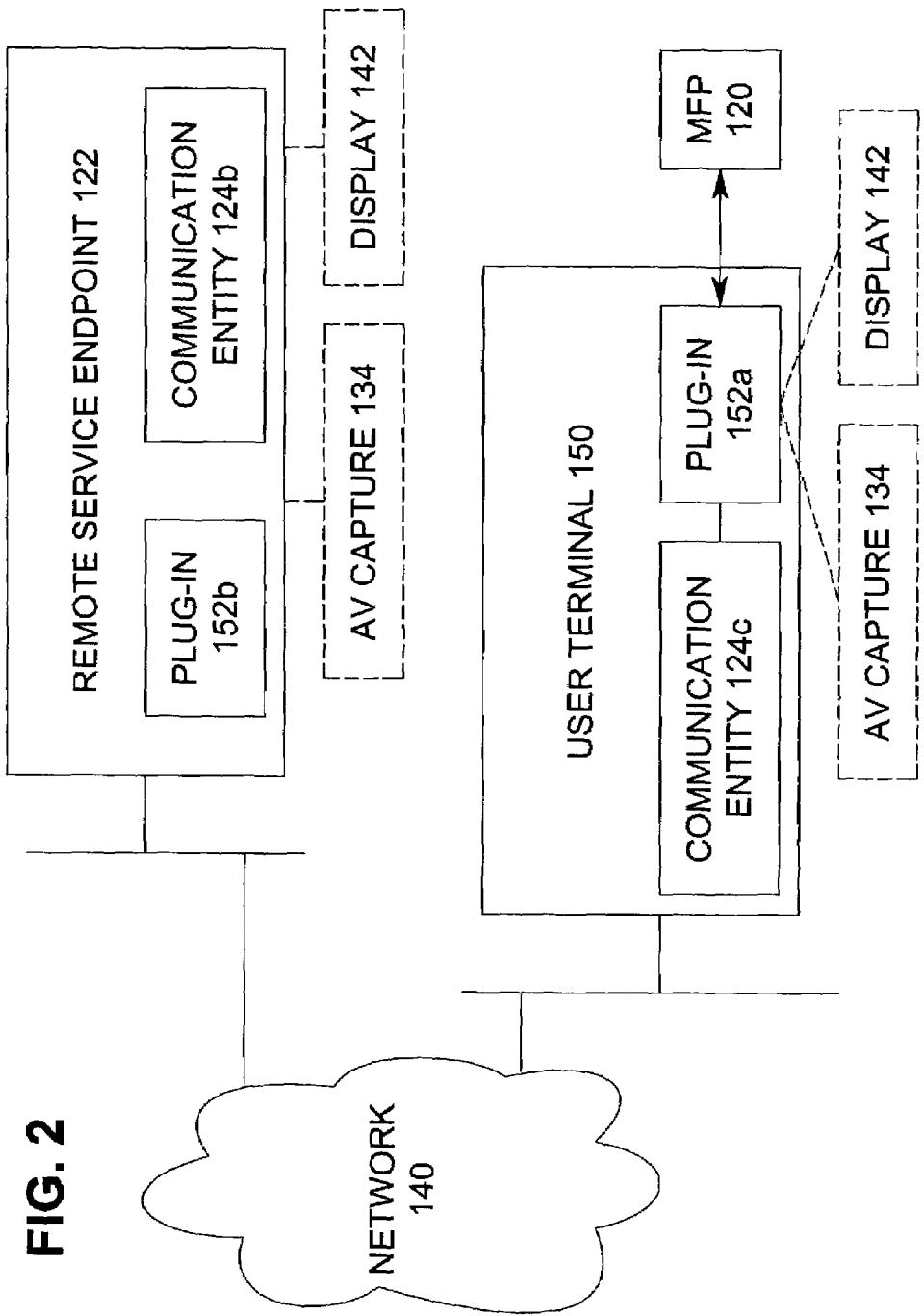
FIG. 2 is a schematic diagram of an exemplary second preferred embodiment of the present invention including a multifunction peripheral and a user terminal in communication with a remote service endpoint.
Figure 3:
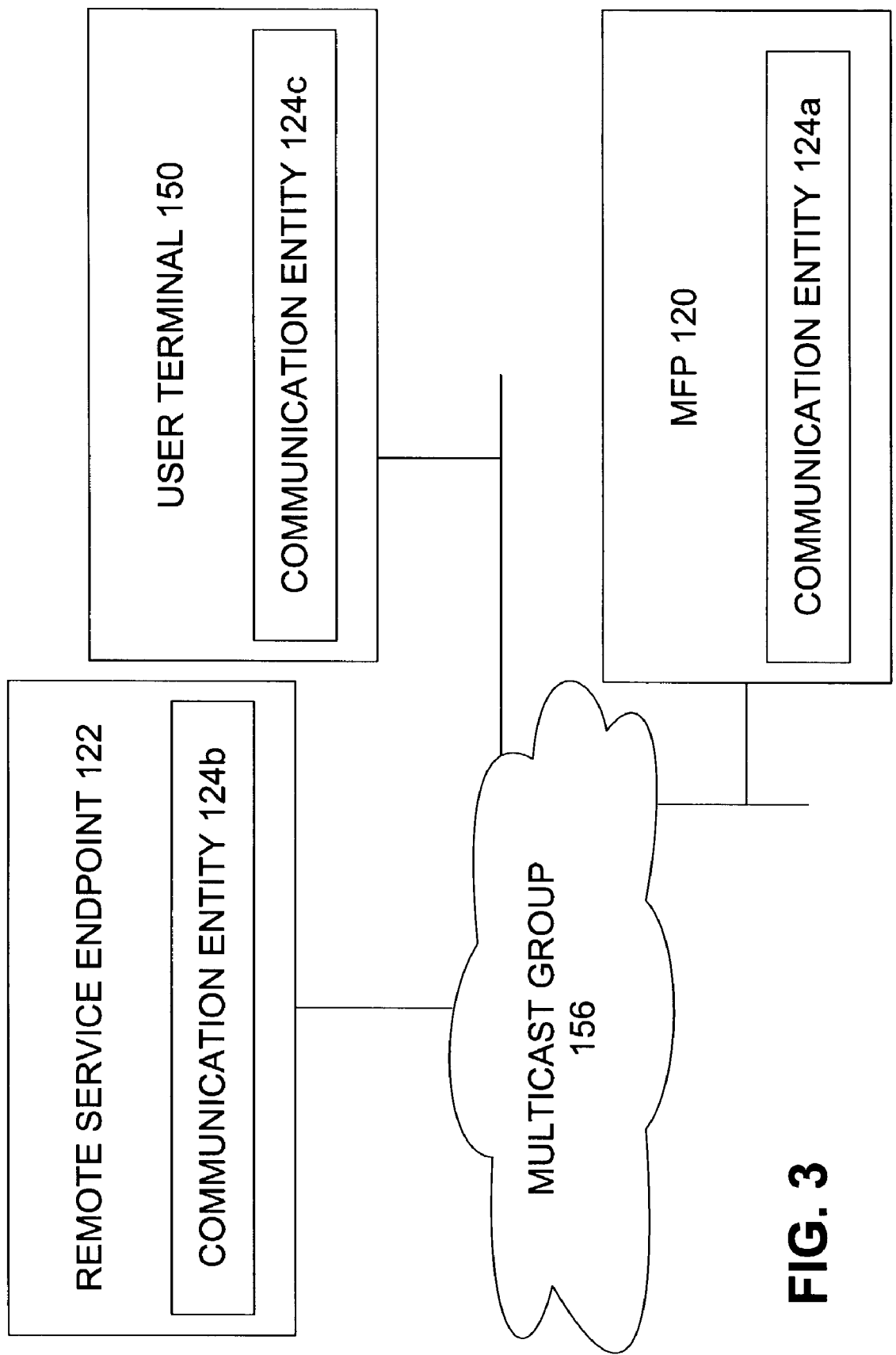
FIG. 3 is a schematic diagram of an exemplary third preferred embodiment of the present invention including a multifunction peripheral, a user terminal, and a remote service endpoint in communication with each other.

FIGS. 1–3 show three exemplary embodiments of the present invention.

FIG. 1 shows an exemplary first embodiment of the multifunction peripheral 120 of the present invention that is configured for supporting real-time interactive multimedia (audio, video, data, and/or control signals) for remote diagnostics, maintenance, and assistance through interaction with a remote service technician at a remote service endpoint 122. In this embodiment, the multifunction peripheral 120 has an associated communication entity 124a and the remote service endpoint 122 has an associated communication entity 124b. The multifunction peripheral and remote service endpoint's communication entities 124a, 124b communicate using audio, video, data, and/or control signals. The data may be communicated on a data channel such as a T.120 data channel. The data preferably conforms to a proprietary protocol which can be designed to let the remote service endpoint 122 communicate the service commands to the multifunction peripheral 120 and obtain diagnostic and maintenance information from the multifunction peripheral 120. Microsoft NetMeeting® SDK Data Channel is an example of a channel that can be used for this purpose. In the shown exemplary embodiment, the multifunction peripheral 120 includes a multifunction peripheral controller 126 including the communication entity 124a and a configuration module 132 suitable for receiving user interaction from a user interface 128 (including communication directly with the remote service endpoint 122) or error signals from an error sensor and/or generator 130. The communication entity 124a receives data from the configuration module 132 and audio and/or visual data from the audio/visual capture device 134. It should be noted that suitable signals may flow both ways between the multifunction peripheral controller 126 and the audio/visual capture device 134 to control audio/video or other multimedia devices. Suitable signals may include request signals, data signals, and control signals. Then, using a network interface 136 and a network 140, the multifunction peripheral 120 transmits the data to the communication entity 124a of the remote service endpoint 122 where a remote service technician receives and interprets the information. The remote service technician then provides solutions using, for example, audio, video, data, and/or control signals and returns it over the network 140. The solution may be played, displayed (on the display 142), or implemented on the multifunction peripheral 120. It should be noted that suitable signals may flow both ways between the multifunction peripheral controller 126 and the display 142 to display the audio and/or video. The multifunction peripheral controller 126 may also be associated with or include a user interface 128 trough which the user may interact with the multifunction peripheral 120, an error sensor(s), and/or an error generator 130 that are able to sense various multifunction peripheral errors, address generators (not shown), and other functional modules necessary to implement the present invention.

FIG. 2 shows an exemplary second embodiment of the present invention that includes a multifunction peripheral 120 that is associated with a user terminal 150 for supporting real-time interactive multimedia (audio, video, data, and/or control signals) for remote diagnostics, maintenance, and assistance through interaction with a remote service technician at a remote service endpoint 122. In this embodiment, the multifunction peripheral 120 is functionally attachable, directly or indirectly, to the user terminal 150 using connection means (e.g. networking, hard wired, wireless, or any other suitable connection means known or yet to be developed). The user terminal 150 has an associated communication entity 124c and the remote service endpoint 122 has an associated communication entity 124b. The user terminal and remote service endpoint's communication entities 124c, 124b communicate using audio, video, data, and/or control signals over a data channel. The multifunction peripheral 120 communicates and acts as an input data source for the data channel. An application program running on the user terminal 150 communicates with the multifunction peripheral 120 and translates the diagnostic information to be sent on the data channel. The application program also translates the commands from the remote service endpoint 122 and passes them on to the multifunction peripheral 120. The commands instruct the multifunction peripheral 120 to run and generate requested diagnostic and maintenance information. In this exemplary scenario, the communication between the user terminal and the multifunction peripheral 120 may use a proprietary protocol. In this shown embodiment the multifunction peripheral 120 does not need the full communication stack (or T.120 stack). The user terminal 150 may include a special "plug-in" 152a that integrates the data channel with the proprietary protocol. The plug-in 152a would be used to translate signals and messages between the remote service endpoint 122 and the multifunction peripheral 120. The remote service endpoint 122 also has a corresponding plug-in 152b. A user interface 128 (not shown), an error generator 130 (not shown), an audio/visual capture device 134, and/or display 142 may be functionally associated with the multifunction peripheral 120 and/or the user terminal 150 (e.g.1 the audio/visual capture device 134 and the display 142 are shown as connected with the plug-in 152a).

FIG. 3 shows an exemplary third embodiment of the present invention that includes at least one multifunction peripheral 120, an optional at least one user terminal 150, and at least one remote service endpoint 122 (each of which are configured for supporting real-time interactive multimedia including audio, video, data, and/or control signals) in functional communication with each other for remote diagnostics, maintenance, and assistance between a user and a remote service technician. As shown, in this embodiment, the multifunction peripheral 120, user terminal 150, and the remote service endpoint 122 each have communication entity capability and are part of a multi-party communication conference through a multicast group 156 or other networking technology as an alternative to the traditional networks shown in FIGS. 1 and 2. This embodiment may be implemented without the user terminal 150 if the multifunction peripheral is implemented similarly to the embodiment shown in FIG. 1. This third exemplary embodiment includes multifunction peripheral 120 with or without video and audio exchange capability, but with data channel capability that allows the multifunctional peripheral 120 to receive remote signals (directly or indirectly), interpret remote commands, and pass diagnostic and maintenance information directly or indirectly to the remote service endpoint 122. In this scenario, the call may be originated by the user terminal 150 or remote service endpoint 122.

It should be noted that the audio/visual capability of the present invention may be captured and/or sent using a viewcam, digital camcorder, or other suitable audio/visual capture device 134 for capturing and sending audio and/or video signals. The audio/visual device used to provide the audio/visual signal may be integral with the multifunction peripheral 120 or the multifunction peripheral 120 may be configured with appropriate structure for interfacing with the audio/visual device. Exemplary interfacing structure may include a USB port, IEEE 1392 standard (e.g. FireWire or i.link), or other known or yet to be developed structure suitable for supporting an audio/visual device. It should be noted that the video signals may include streaming video, still photos, static images, and textual messages.

It should also be noted that the audio/visual capture device 134 and display 142 might provide the sole means for capturing and playing the audio signal of the multifunction peripheral 120. Alternatively, that the audio/visual capture device 134 and display 142 might provide an audio signal of the multifunction peripheral 120 specifically associated with the video signal (with an additional audio signal device(s) such as a telephone, microphone, speaker, or other audio communication device(s) being incorporated with the multifunction peripheral 120) for handling audio signals. In still another embodiment, the audio/visual capture device 134 may not support audio signals and, instead, one or more separate audio signal device(s) such as a telephone, microphone, speaker, or other audio communication device might handle audio signals.

Further, it should be noted that data and/or control signals may flow directly to the multifunction peripheral controller 126 without being displayed or a separate notice (perhaps textual) may be displayed that indicates the status and/or other information about the data or control signals.

It should be noted that the communication entity may be based, for example, on the H.323 standard protocol, which is approved by the International Telecommunication Union (ITU) as a standard addressing multimedia communication protocol. A protocol defines how audio/visual conferencing data is transmitted across packet-based networks. The H.323 standard allows users to participate in the same conference even though they are using different videoconferencing applications. A popular application of the H.323 standard is illustrated in Microsoft's NetMeeting® application, The Internet Comm Suite™, Intel Video Phone™, iVisit™, CU-seeMe®, and ICUII™. Alternative addressing multimedia communication protocols include, for example, other H.32× series standards, proprietary protocols, or other protocols yet to be developed.

Figure 4:
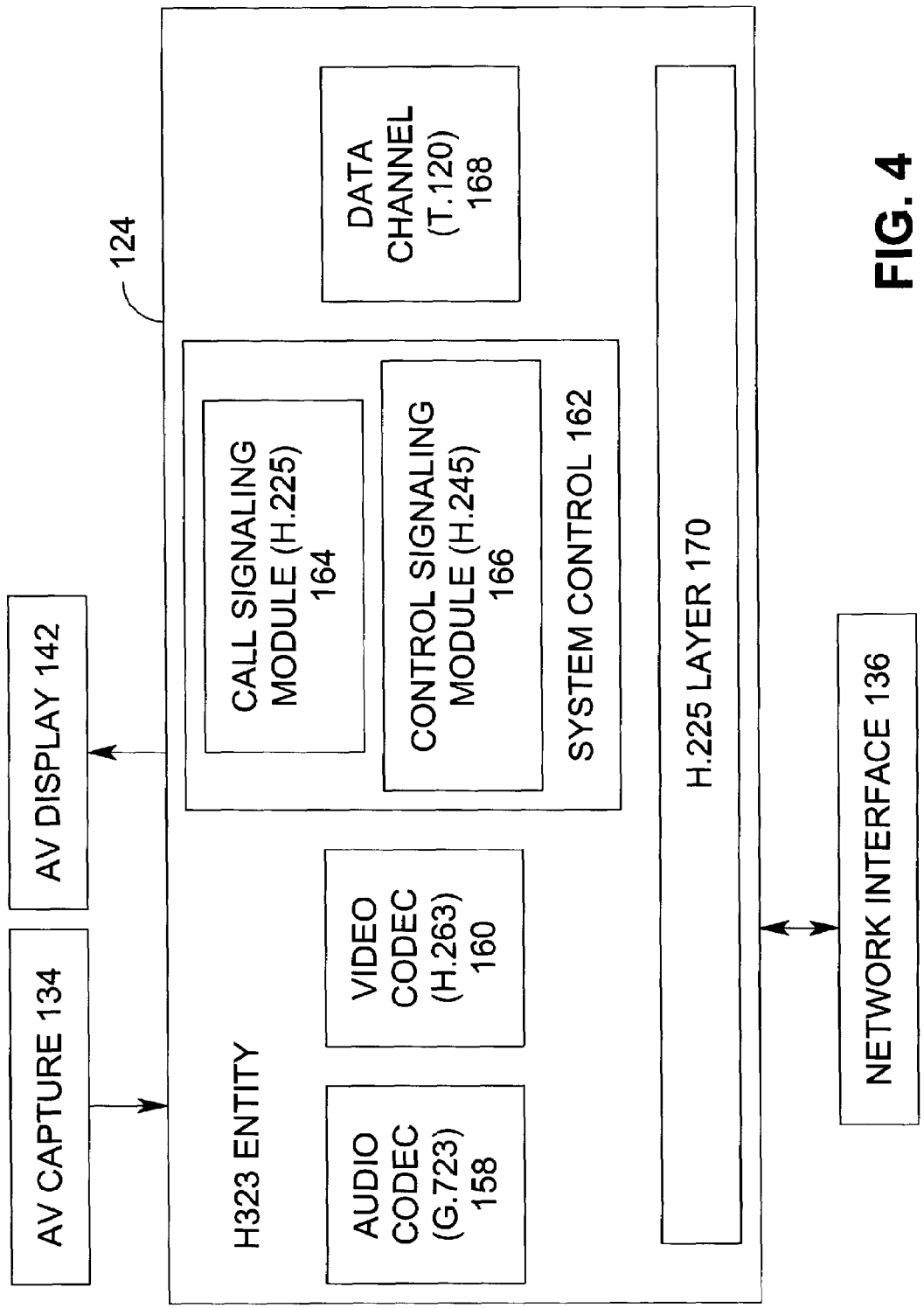
FIG. 4 is an exemplary schematic diagram of a standard means for audiovisual conferencing and specifically a schematic diagram of an exemplary H.323 standard.

FIG. 4 shows typical elements of a H.323 communication entity 124. An H.323 communication entity 124 consists of audio and video codecs 158,160. As an example, G.723 codec 158 can be used for audio and H.263 codec 160 can be used for video. The AV codecs 158,160 encode the audio/visual captured data captured by the audio/visual capture device 134 and decode the received audio/visual data, which will be sent to audio/visual display 142. The system control 162 may include a call signaling module 164 and a control signaling module 166. The control signaling module 166 may implement a protocol such as H.245 protocol to handle the control signaling. The call signaling module 164 may implement a protocol such as H.225 protocol to handle call signaling. In this shown embodiment, T.120 data channel series recommendations are used for the data channel 168. A H.225 layer 170 formats the transmitted audio, video, data, and/or control signal streams into messages for output to the network interface 136 and retrieves the received audio, video, data, and/or control signal streams from messages that have been input from the network interface 136.

The data channel 168 may be, for example, a T.120 data channel. The T.120 standard was established by the International Telecommunications Union as a family of open standards and contains a series of communication and application protocols and services that provide support for real-time, multipoint data communications. The T.120 standard supports a broad range of transport options, including the Public Switched Telephone Networks (PSTN or POTS), Integrated Switched Digital Networks (ISDN), Packet Switched Digital Networks (PSDN), Circuit Switched Digital Networks (CSDN), and popular local area network protocols (such as TCP/IP and IPX via reference protocol). Furthermore, these vastly different network transports, operating at different speeds, can easily co-exist in the same multipoint conference. Alternative data channels include, for example, other data channels yet to be developed.

The network 140 may be any type of network including, but not limited to the internet, a local area network (LAN), a wireless network, or other networking structure known or yet to be discovered.

Figure 6:
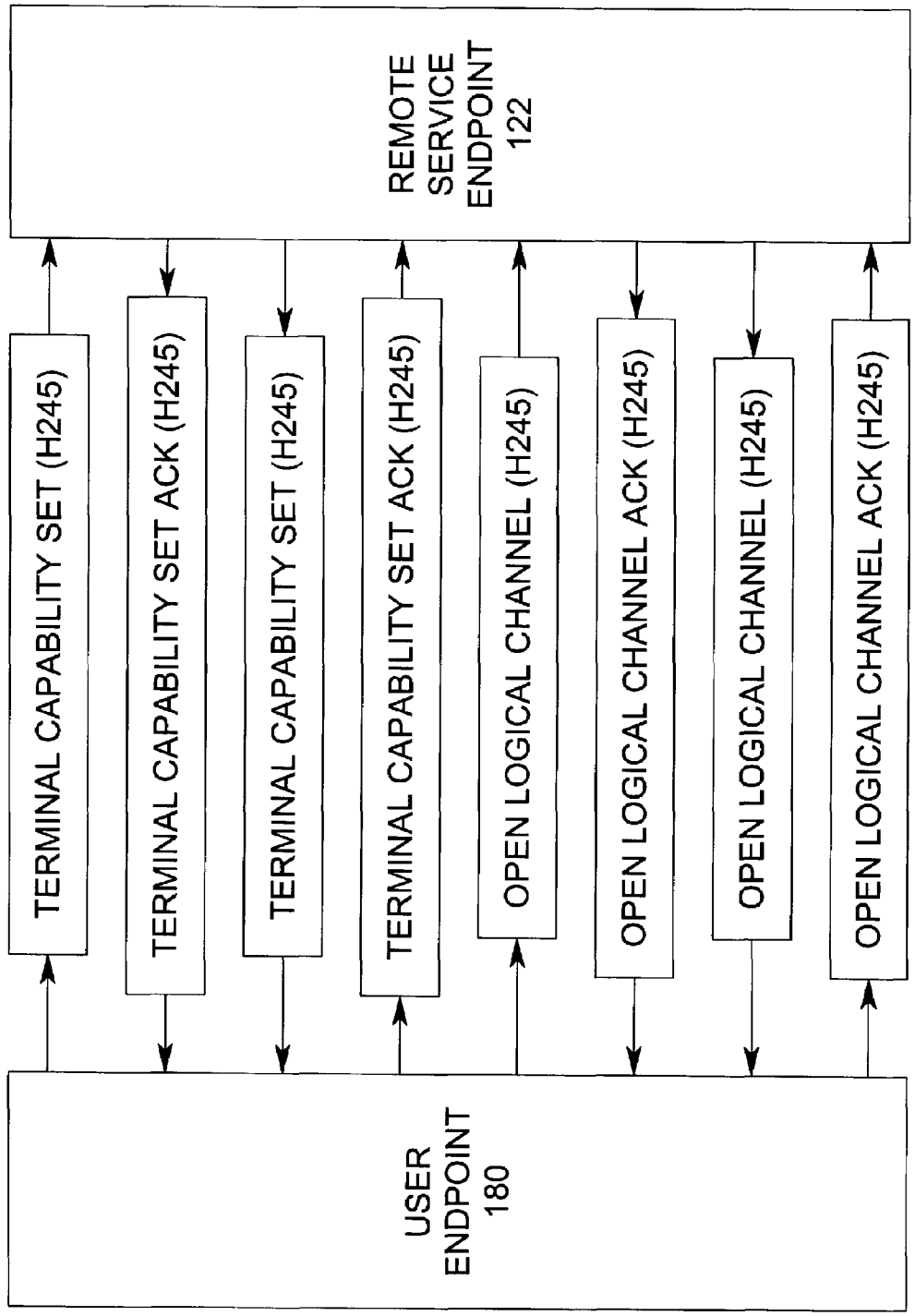
FIG. 6 is a block diagram showing signal flow during an exemplary capability exchange phase of the multifunction peripheral of the present invention.
Figure 7:
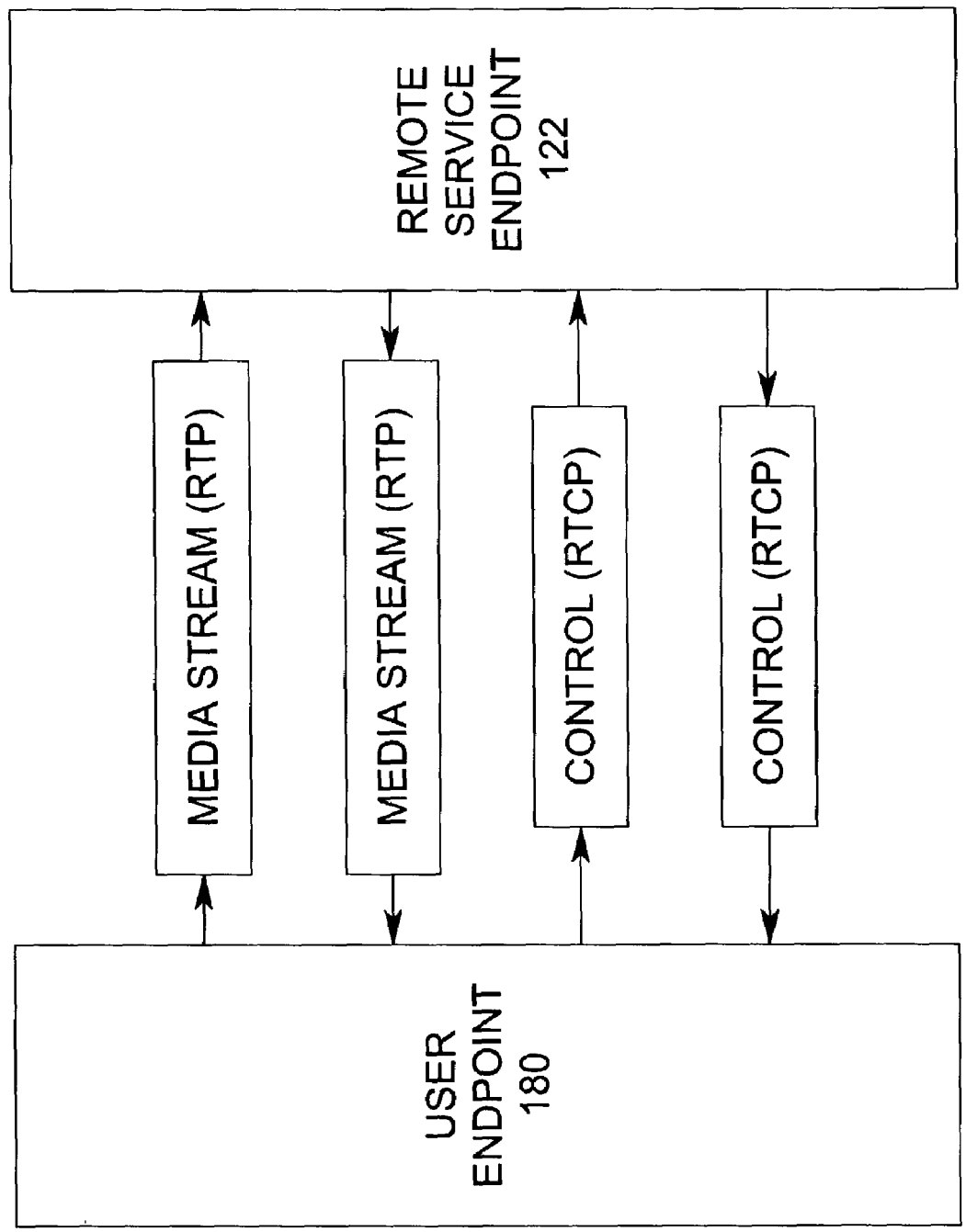
FIG. 7 is a block diagram showing signal flow during an exemplary media exchange phase of the multifunction peripheral of the present invention.
Figure 8:
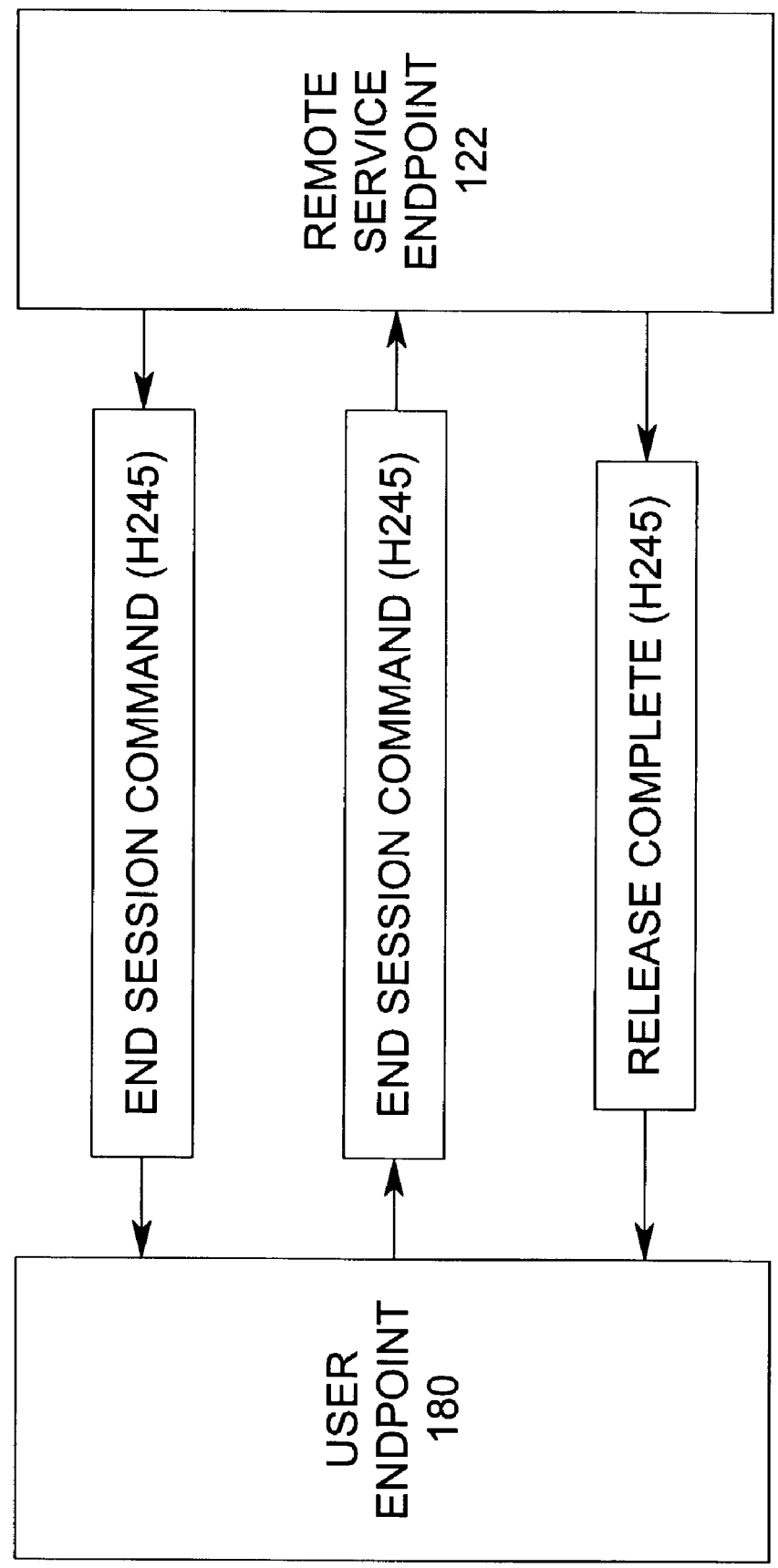
FIG. 8 is a block diagram showing signal flow during an exemplary call end phase of the multifunction peripheral of the present invention.

FIGS. 5–8 show a simple example of various steps in a typical call for remote diagnostics, maintenance, and assistance between a user endpoint 180 (the multifunction peripheral 120 or the user terminal 150) and a remote service endpoint 122. These figures are specifically directed to the embodiment of FIG. 1 using H.323 communication entities 124a, 124b, however, the steps shown therein could be adapted for alternative embodiments. Assuming embodiment 1 described above, for purposes of this example, a call can be broken into the following four phases: Call Setup (FIG. 5), Capability Exchange (FIG. 6), Media Exchange (FIG. 7), and Call End (FIG. 8). These phases are discussed individually, but could be combined or divided as desired.

Figure 5:
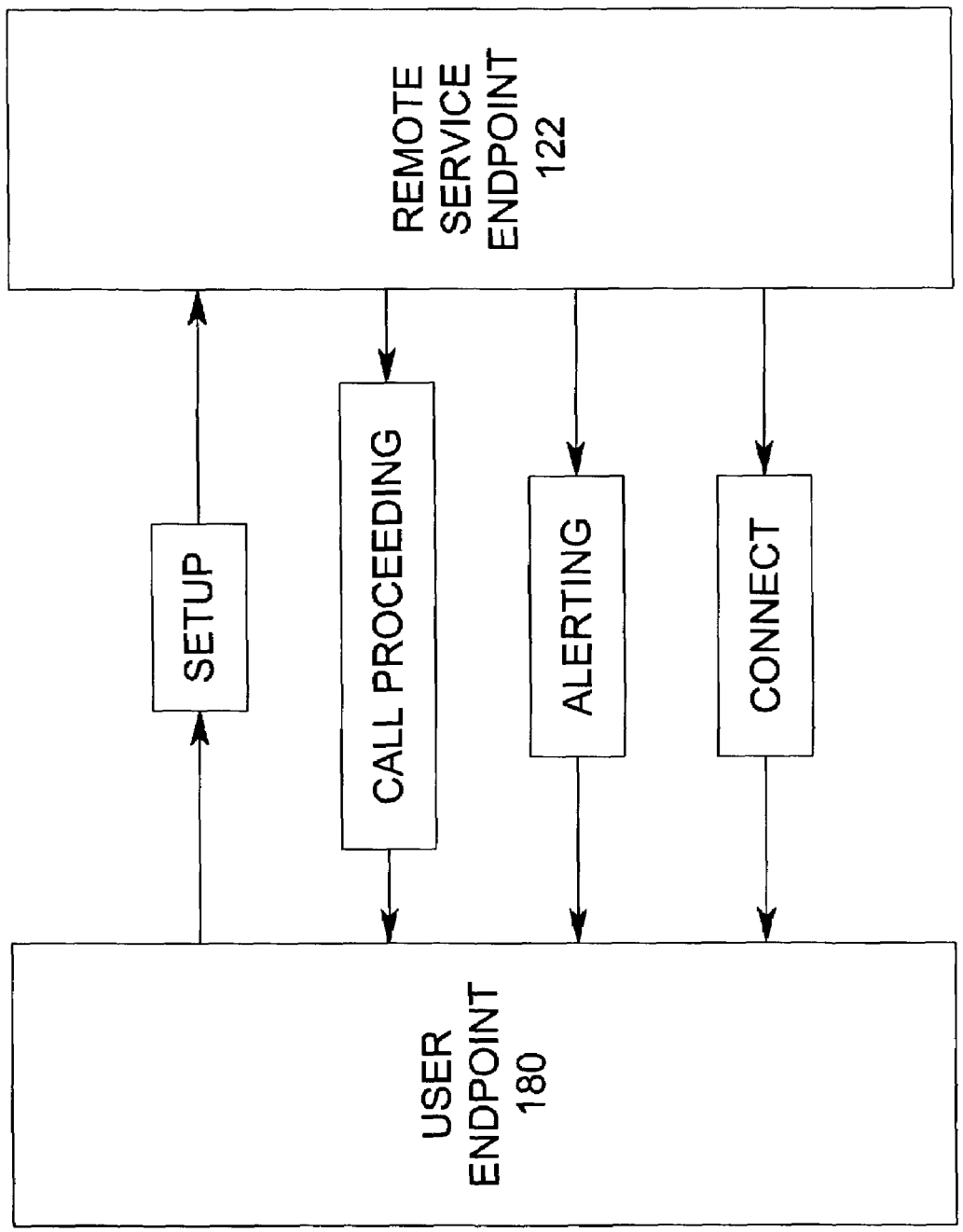
FIG. 5 is a block diagram showing signal flow during an exemplary call set-up phase of the multifunction peripheral of the present invention.

FIG. 5 shows an exemplary embodiment of a Call Setup phase. In this scenario the user endpoint 180 and the remote service endpoint 122 are communicating directly, without a gatekeeper. Assuming the call originates from the customer, the user endpoint 180 sends a Setup message to the remote service endpoint 122. The information about the remote service endpoint 122 is preferably pre-configured into the multifunction peripheral 120. The remote service endpoint 122 then sends Call Proceeding and/or Alerting messages. Once the messages (Call Proceeding, Alerting) have been exchanged, a Connect message is sent by the remote service endpoint 122. In the shown embodiment, the Connect message preferably contains a H.245 control channel transport address.

FIG. 6 shows an exemplary embodiment of a Capability Exchange phase that follows the Call Setup phase. During the Capability Exchange, a H.245 control channel may be established between the user endpoint 180 and the remote service endpoint 122. H.245 messages are used to exchange capabilities between the user endpoint and the remote service endpoint 122. Exemplary H.245 messages between the user endpoint 180 and the remote service endpoint 122, as shown in FIG. 6, may include TerminalCapabilitySet, TerminalCapabilitySetAck, OpenLogicalChannel, and OpenLogicalChannelAck. The Capability Exchange phase preferably includes a codec capabilities exchange. After the Capability Exchange phase, logical channels may be opened for media data.

FIG. 7 shows an exemplary embodiment of a Media Exchange phase. During the Media Exchange phase, audio, video, data, and/or control signal streams may be exchanged between the user endpoint 180 and the remote service endpoint 122. Specifically, after the Capability Exchange phase, logical channels are opened for streams between the user endpoint and the remote service endpoint 122. FIG. 7 shows media streams and control streams being transported using H.225 recommendation. This involves use of RTP (Real-time Transport Protocol) and RTCP (RTP's control protocol) as shown in FIG. 7. The data stream may be transported reliably using, for example, T.120 recommendation.

FIG. 8 shows an exemplary embodiment of a Call End phase. The call can be ended from either the user endpoint 180 or the remote service endpoint 122. The audio, video, data, and/or control signal transmission may be discontinued and all logical channels are closed at the end of the call. In the shown embodiment, H.245 EndSessionCommand messages are exchanged in both directions followed by a ReleaseComplete message to close call signaling channel (H.225).

FIG. 9 shows an exemplary method performed by a multifunction peripheral of the present invention. First, the multifunction peripheral is connected with a remote service endpoint to provide multimedia communication therebetween 182. The connection may be made in a manner shown in FIG. 5. Then, capabilities between the multifunction peripheral and the remote service endpoint may be exchanged 184. The exchange may be accomplished in a manner shown in FIG. 6. Multimedia information (e.g. audio, video, data, and/or control signals) may then be exchanged between the multifunction peripheral and the remote service endpoint 186. The exchange may be accomplished in a manner shown in FIG. 7. A remote service technician or an automated process may then produce a diagnosis by examining the multifunction peripheral and diagnosing a problem based on the multimedia information 188. Then instructional multimedia (e.g. audio, video, data, and/or control signals) related to the diagnosis may be sent from the remote service endpoint and received by the user endpoint 190. The user may then service the multifunction peripheral with the assistance of a remote service technician 192. Preferably this servicing is done by exchanging multimedia information between the multifunction peripheral and the remote service endpoint 194, monitoring the multifunction peripheral at the remote service endpoint 196, receiving instructional multimedia at the multifunction peripheral 198, and repeating the steps of monitoring and receiving instructional multimedia until the multifunction peripheral is serviced.

The following are exemplary scenarios of four potential uses of the multimedia peripheral of the present invention.

One type of multimedia peripheral error is a simple maintenance problem such as a paper jam. When a paper jam occurs, the user will need to access the multifunction peripheral 120 in various locations to identify and remove the paper jam. The paper jam could be located in the scanning portion of the multifunction peripheral 120 or the copier/printer portion. For this type of problem, the present invention may be used to alert the user (with the error sensor and/or generator 130 sensing the error and a notice of the error being displayed on the display 142) or the user may discover the error (and report it through the user interface 128). The user may then contact the remote service technician using the multifunction peripheral 120. This feature allows the remote service technician to speak with the user at the multifunction peripheral. The user can direct the audio/visual capture device 134 so that the remote service technician can see the inner workings of the multifunction peripheral and find the paper jam. The remote service technician can then provide live instruction to the user (while the user stands at the multifunction peripheral 120) on how to clear the paper jam. Alternatively, the remote service technician may provide a full motion video that shows the proper body movements of the maintenance person during the operation of fixing the paper jam. Because the remote service technician has had an opportunity to interact with the user, the remote service technician may select an instructional video suited to the user's skill level and may augment the video with live assistance. During the process of clearing the paper jam, the present invention can allow the remote service technician to monitor the user. Further, by using the audio feature of the multimedia presentation, the remote service technician is able to coach the user, even when the user's eyes are focused on the inner workings of the multifunction peripheral 120 and away from the display 142. If the user attempts to do something that is dangerous or potentially harmful to the multifunction peripheral 120, the remote service technician may be able to see the potential error and provide immediate feedback to the user. During the process of fixing this multimedia peripheral error the remote service technician may remotely access the multifunction peripheral 120 and acquire diagnostic data that allows the remote service technician to provide suggestions as to other upcoming problems, update software, or identify broken components.

Another type of multimedia peripheral error includes everyday problems such as basic maintenance and servicing. Basic maintenance and servicing may include such everyday problems as adding paper, ink, toner, staples, and/or developer. While these would not be considered a problem to a sophisticated user or a user familiar with a particular multifunction peripheral 120, infrequent users or less sophisticated users of a multifunction peripheral 120 would find this everyday maintenance confusing. For this type of problem, the present invention may be used to alert the user (with the error sensor and/or generator 130 sensing the error and a notice of the error being displayed on the display 142) or the user may discover the error (and report it through the user interface 128). The user may then contact the remote service technician using the multifunction peripheral 120. This feature allows the remote service technician to speak with the user at the multifunction peripheral. The user can direct the audio/visual capture device 134 so that the remote service technician can see the inner workings of the multifunction peripheral and/or the user while the user is correcting the error. The remote service technician can then provide live instruction to the user (while the user stands at the multifunction peripheral 120) on how to add paper, ink, toner, staples, and/or developer. Alternatively, the remote service technician may provide a full motion video that shows the proper body movements of the maintenance person during the operation of adding paper, ink, toner, staples, and/or developer. Because the remote service technician has had an opportunity to interact with the user, the remote service technician may select an instructional video suited to the user's skill level and may augment the video with live assistance. During the process of adding paper, ink, toner, staples, and/or developer, the present invention can allow the remote service technician to monitor the user. Further, by using the audio feature of the multimedia presentation, the remote service technician is able to coach the user, even when the user's eyes are focused on the inner workings of the multifunction peripheral 120 and away from the display 142. If the user attempts to do something that is dangerous or potentially harmful to the multifunction peripheral 120, the remote service technician may be able to see the potential error and provide immediate feedback to the user. One case where this invention would be useful is the toner replacement instructions for the Sharp AR-505 printer/copier. The existing instructions that describe the removal of the toner cartridge tape seal are vague and it is not clear how textual descriptions would enhance the user's understanding of this procedure. Since the consequences of incorrectly performing this procedure are serious, a full-motion video of the procedure would be welcomed. During the process of adding paper, ink, toner, staples, and/or developer the remote service technician may remotely access the multifunction peripheral 120 and acquire diagnostic data that allows the remote service technician to provide suggestions as to other upcoming problems, update software, or identify broken components.

Yet another type of multimedia peripheral error includes true technical problems. True technical problems are generally more complicated and generally require a service technician to fix or repair and, therefore are generally quite expensive. True technical problems, for purposes of this invention, also include installation of new hardware and software. A multimedia peripheral incorporating the present invention may be used to help diagnose and repair certain types of true technical problems that would otherwise require a service technician. For this type of problem, the present invention may be used to alert the user (with the error sensor and/or generator 130 sensing the error and a notice of the error being displayed on the display 142) or the user may discover the error (and report it through the user interface 128). The user may then contact the remote service technician using the multifunction peripheral 120. This feature allows the remote service technician to speak with the user at the multifunction peripheral. The user can direct the audio/visual capture device 134 so that the remote service technician can see the inner workings of the multifunction peripheral 120 and find the technical problem. Using the audio features of the multifunction peripheral 120, the remote service technician is able to hear the multifunction peripheral 120 in operation to check for broken components and otherwise help in the diagnosis. The remote service technician may also request diagnostic data from the multifunction peripheral 120. The remote service technician can then provide live instruction to the user (while the user stands at the multifunction peripheral 120) on how to fix the technical problem. Alternatively, the remote service technician may provide a full motion video that shows the proper body movements of the maintenance person during the operation of fixing the technical problem. Because the remote service technician has had an opportunity to interact with the user, the remote service technician may select an instructional video suited to the user's skill level and may augment the video with live assistance. During the process of fixing the technical problem, the present invention can allow the remote service technician to monitor the user. Further, by using the audio feature of the multimedia presentation, the remote service technician is able to coach the user, even when the user's eyes are focused on the inner workings of the multifunction peripheral 120 and away from the display 142. If the user attempts to do something that is dangerous or potentially harmful to the multifunction peripheral 120, the remote service technician may be able to see the potential error and provide immediate feedback to the user. During the process of fixing this multimedia peripheral error the remote service technician may remotely access the multifunction peripheral and acquire diagnostic data that allows the remote service technician to provide suggestions as to other upcoming problems, update software, or identify broken components. Further, if the remote service technician must visit the site, the time required to repair the multifunction peripheral should be substantially lessened because the remote service technician will have already made a detailed analysis of the malfunction based on the "pre-acquired" diagnostic and sensory data. Once the remote service technician is on-site, the remote service technician will be able to interact, in real time, with additional service personnel at the remote service technician's office.

Sometimes using a multifunction peripheral's 120 basic functions is even problematic. For example, users may have difficulties navigating the user interface 128 to identify and use basic functions of interest. For example, a walk-up user may want to collate and staple output papers or transmit a document to a remote party using the network scanner. Generally, for this type of problem, the user may contact the remote service technician using the multifunction peripheral 120. This feature allows the remote service technician to speak with the user at the multifunction peripheral. As with the previous examples, the audio/visual capture device 134 may be used to provide, for example, two-way audio/visual communication (including monitoring the user's actions). The remote service technician may provide live instruction to the user (while the user stands at the multifunction peripheral 120) and/or provide an instructional video specifically suited to the user's skill level. During the process of assisting the user, the remote service technician may remotely access the multifunction peripheral 120 and acquire diagnostic data that allows the remote service technician to verify that the user is accomplishing his desired task or to provide suggestions as to other upcoming problems, update software, or identify broken components.

For purposes of this invention, a multifunction peripheral 120 may include a single function device, particularly if the device is complicated. Although shown and described as separate components, the components of the present invention may be implemented in a single chip or using various combinations of components. The present invention may also be a retrofittable unit that attaches to existing multifunction peripherals.

It should be noted that the shown multifunction peripheral is meant to be exemplary and specific features thereof may be changed. For example, the user interface 128 may be separate from the display 142 or the user interface 128 may include or be associated with the display 142. The multifunction peripheral's user interface 128 may include any combination of the following exemplary elements as well as additional traditional elements: a keyboard, a key pad, a small and/or text-only display, simple audio alarms, a video-capable display, and a speaker (e.g., a full-spectrum audio speaker). Further, it should be noted that user interaction might take place in locations other than the traditional user interface 128. For example, for the purpose of this invention, the multifunction peripheral may be able to sense the user interaction with nontraditional user interfaces such as the paper tray, toner cartridge, staples, developer, or damaged component such that the user interaction therewith is received as a signal.

The present invention may be used in conjunction with the invention described in U.S. patent application Ser. No. 10/261,566 entitled Streaming Video for Adaptive User Instructions (the "Streaming Video" application) and filed on Sep. 30, 2002, concurrently with the present invention, which was invented by the applicants of the present invention and assigned to the assignee of the present invention. The entire disclosure of the Streaming Video application is incorporated herein by reference.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A method performed by a peripheral that provides interactive multimedia for remote diagnostics and maintenance of said peripheral, said method comprising the steps of:
   connecting said peripheral with a remote service endpoint to provide communication therebetween;
   exchanging capabilities between said peripheral and said remote service endpoint, wherein said capabilities comprise one or more codec capabilities, wherein the one or more codecs are adapted to perform at least one of the following: encode image data, and decode image data;
   exchanging real time image data, wherein said real time image data comprises real time image data of inner workings of said peripheral, between said peripheral and said remote service endpoint, wherein the step of exchanging real time image data further comprises transmitting, by said peripheral, real time image data of said peripheral to said remote service endpoint, wherein said real time image data of said peripheral are captured in real time by a capture device communicatively associated with said peripheral;
   diagnosing said peripheral based on said transmitted real time image data to produce a diagnosis; and
   receiving information based on said diagnosis at said peripheral.

2. The method of claim 1 further comprising the step of servicing said peripheral.

3. The method of claim 2 wherein said step of servicing said peripheral further comprises the steps of:
   monitoring said peripheral at said remote service endpoint;
   receiving instructional multimedia at said peripheral; and
   repeating said steps of monitoring said peripheral and receiving instructional multimedia until said peripheral is serviced.

4. The method of claim 1 farther comprising the step of displaying said received information based on said diagnosis on a display associated with said peripheral.

5. The method of claim 1 wherein the peripheral is a multifunction peripheral.

6. An interactive multimedia system for remote diagnostics of, maintenance of, and assistance pertaining to a printer, said interactive multimedia system comprising:
   the printer having a printer communication entity, wherein the printer communication entity comprises one or more codecs adapted to perform at least one of the following: encode image data and decode image data;
   a remote service endpoint having a remote service endpoint communication entity, wherein the remote service endpoint communication entity comprises one or more codecs adapted to perform at least one of the following: encode image data, and decode image data;
   a network system over which said printer communication entity communicates with said remote service endpoint communication entity;
   a capture device adapted to capture real time image data of inner workings of said printer, said capture device communicatively associated with said printer communication entity;
   a display communicatively associated with said printer communication entity; and
   said remote service endpoint providing assistance based on said real time image data.

7. The interactive multimedia system of claim 6 further comprising an error sensor/generator for sensing a printer error and providing a printer error signal to said printer communication entity.

8. The interactive multimedia system of claim 7 wherein said printer error is at least one error selected from the following:
   a simple maintenance problem;
   an everyday problem associated with basic maintenance and servicing;
   technical problems;
   installation of initial hardware and software; and
   field upgrades of hardware and software.

9. The interactive multimedia system of claim 6 further comprising a user interface through which users may indirectly communicate with said remote service endpoint.

10. The interactive multimedia system of claim 6 further comprising a user interface through which users may indirectly communicate with said remote service endpoint through said printer and said network system.

11. The interactive multimedia system of claim 6 further comprising a user interface through which users may indirectly communicate with said remote service endpoint through a user terminal and said network system.

12. The interactive multimedia system of claim 11, said user terminal incorporating at least one module selected from the following:
   a peripheral communication entity;
   an audio/visual capture device;
   a display;
   an error sensor/generator; and
   a user interface.

13. The interactive multimedia system of claim 6 further comprising a user terminal interconnectable with said printer, said user terminal being an intermediary between said printer and said network system.

14. The interactive multimedia system of claim 6 further comprising audio projectors for playing audio.

15. The interactive multimedia system of claim 6 wherein said display is adapted to display real-time instructional multimedia information.

16. The method of claim 6 wherein the printer is a multifunction peripheral.

17. A printer, said printer device comprising:
   a network interface adapted to be operatively coupled to a network to communicate with a remote service endpoint;

a capture device adapted to be directed to capture real time image data of at least some inner workings of said printer device;

a communication entity comprising a video codec, said communication entity coupled to said capture device and to said network interface, wherein said video codec is adapted to perform at least one of the following: encode image data and decode image data; and a printer function module.

18. The device of claim 17 further comprising a display adapted to present data received via said communication entity.

19. The device of claim 17 wherein the communication entity is adapted to support an H.323 standard.

20. The device of claim 17 wherein the device is a multifunction peripheral.

21. The device of claim 17 wherein said capture device is communicatively associated with said device via a USB port.

22. An interactive multimedia system for remote diagnostics of a peripheral, said interactive multimedia system comprising:

a peripheral comprising a communication entity, a capture device, and a presentation device, wherein said communication entity comprises an audio codec and a video codec, said capture device adapted to capture at least one of the following: audio data and visual data; and said presentation device adapted to present information received from at least one of the following: a remote service endpoint and a terminal;

said remote service endpoint comprising a communication entity, a capture device, and a presentation device, wherein said communication entity comprises an audio codec and a video codec, said capture device adapted to capture at least one of the following: audio data and visual data; and said presentation device adapted to present information received from at least one of the following: said peripheral and said terminal;

said terminal comprising a communication entity, a capture device, and a presentation device, wherein said communication entity comprises an audio codec and a video codec, said capture device adapted to capture at least one of the following: audio data and visual data; and said presentation device adapted to present information received from at least one of the following: said peripheral and said remote service endpoint; and a network system over which said peripheral, said service endpoint, and said user terminal communicate with each other;

wherein the peripheral, remote service endpoint, and the terminal are each adapted to communicate with each other in real-time interactive multimedia via each of their said communication entity.

23. The system of claim 22 wherein the communication entity is adapted to support an H.323 standard.

24. The system of claim 22 wherein the peripheral is a printer.

25. The system of claim 22 wherein said peripheral is a multifunction peripheral.

26. The system of claim 22 wherein said peripheral further comprises a user interface via which communication is provided with said remote service endpoint.

27. The system of claim 22 wherein said terminal further comprises a user interface via which communication is provided with said remote service endpoint.

28. The system of claim 22 wherein said remote service endpoint further comprises a user interface via which communication is provided with said peripheral.

29. The system of claim 22 wherein said peripheral further comprises at least one error sensor/generator.

30. The system of claim 22 wherein said terminal further comprises a user interface adapted to be in functional communication with said peripheral.

31. A method performed by a printer that provides interactive data for remote diagnostics and maintenance of said printer, said method comprising the steps of:

connecting said printer with a remote service endpoint to provide communication therebetween;

exchanging capabilities between said printer and said remote service endpoint, wherein said capabilities comprise one or more codec capabilities adapted to perform at least one of the following: encode image data and decode image data; and exchanging real time image data between said printer and said remote service endpoint based on said capabilities, wherein the step of exchanging real time image data farther comprises transmitting by said printer real time image data of inner workings of said printer.

32. The method of claim 31 wherein the peripheral is a printer.

* * * * *